UNITED STATES PATENT OFFICE.

CHARLES P. CROSSMAN, OF WEST WARREN, MASSACHUSETTS, ASSIGNOR OF ONE-HALF HIS RIGHT TO FRANKLIN BEMIS, OF SAME PLACE.

IMPROVEMENT IN FIRE-PROOF PAINTS.

Specification forming part of Letters Patent No. 134,522, dated January 7, 1873.

*To all whom it may concern:*

Be it known that I, CHARLES P. CROSSMAN, of West Warren, Worcester county, Massachusetts have made and invented an Improved Fire-Proof Paint, of which the following is a specification:

To make and compound my improved paint, take of common lime, freshly slaked, of hydraulic lime, and of silicious or argillaceous matter, (sand or pulverized slate,) equal parts, to which add cow's milk, in sufficient quantity to give the whole, when thoroughly mixed, the proper consistency for laying and spreading with the ordinary brush.

Any desirable pigment or coloring matter may be added to the compound, but for the painting of roofs, shingles, tin-work, iron-work, &c., to which my paint is specially adapted, I prefer to use as coloring matter what is known as "Brandon brown," a pulverized substance dug or mined at Brandon, Rutland county, Vermont; and the proportions then are, one part Brandon brown; ten, common lime; ten, hydraulic lime; ten, silicious or argillaceous matter; and milk enough to give proper spreading consistency.

The addition of glue or resin, or both, to the compound above described is not found detrimental, and may, in some cases, be of decided value.

The ingredients above named may be mixed and compounded in proportions varying considerably from those pointed out without material injury, but I consider the proportions named productive of the best result. Not confining myself therefore to said exact proportions—

What I claim as my invention is—

1. A composition whereof the ingredients are common lime, hydraulic lime, silicious or argillaceous matter, and cow's milk, substantially in the proportions specified.

2. A composition whereof the ingredients are common lime, hydraulic lime, Brandon brown, silicious or argillaceous matter, and cow's milk, all substantially in the proportions above specified.

CHAS. P. CROSSMAN.

Witnesses:
 JOS. B. LOMBARD,
 JOS. S. TIDD.